United States Patent [19]
Albrecht et al.

[11] 3,913,044
[45] Oct. 14, 1975

[54] SUPERCONDUCTING MAGNET WITH RIBBON-SHAPED CONDUCTOR

[75] Inventors: Cord Albrecht, Erlangen; Hans Lamatsch, Nurnberg, both of Germany

[73] Assignee: Siemens Aktiengesellschaft, Munich, Germany

[22] Filed: Oct. 18, 1973

[21] Appl. No.: 407,619

[30] Foreign Application Priority Data

Nov. 17, 1972 Germany ............................ 2256594

[52] U.S. Cl. .......... 335/216; 174/DIG. 6; 174/15 C; 174/115

[51] Int. Cl.$^2$ .......................................... H01L 39/02

[58] Field of Search ............ 174/15 C, DIG. 6, 115; 335/216

[56] References Cited

UNITED STATES PATENTS

| | | | |
|---|---|---|---|
| 3,432,783 | 3/1969 | Britton | 174/DIG. 6 |
| 3,443,021 | 5/1969 | Schrader | 335/216 X |
| 3,458,842 | 7/1969 | Zar | 335/216 |
| 3,548,078 | 12/1970 | Albrecht | 174/DIG. 6 |

FOREIGN PATENTS OR APPLICATIONS

| | | | |
|---|---|---|---|
| 2,008,009 | 9/1970 | Germany | 174/DIG. 6 |

*Primary Examiner*—E. A. Goldberg
*Attorney, Agent, or Firm*—Kenyon & Kenyon Reilly Carr & Chapin

[57] ABSTRACT

An improved ribbon-shaped conductor which is made up of several individual conductors each containing a plurality of superconductors in which the individual conductors are fastened side-by-side on a flat side of a reinforcing strip with mutual spacing between individual conductors to provide a ribbon-shaped conductor which substantially reduces the excitation build-up losses caused by transversal currents in superconducting magnet coils.

11 Claims, 7 Drawing Figures

Fig. 3.
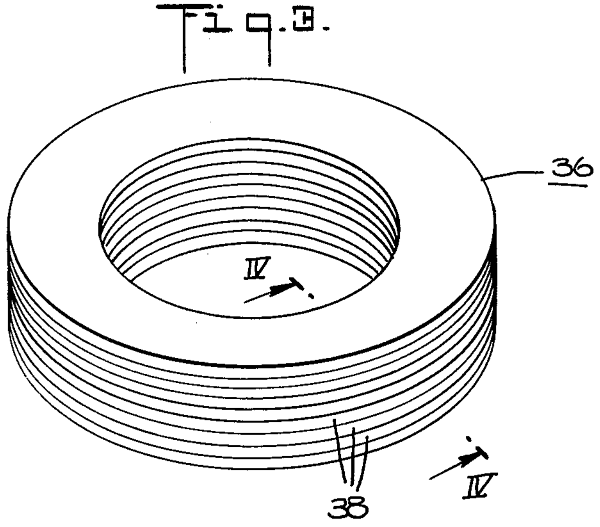
Fig. 4A. Fig. 4B. Fig. 4C.
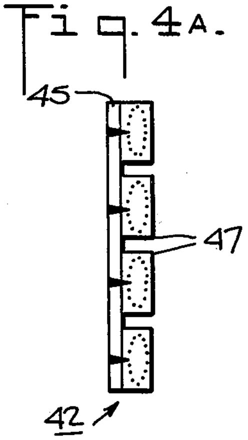
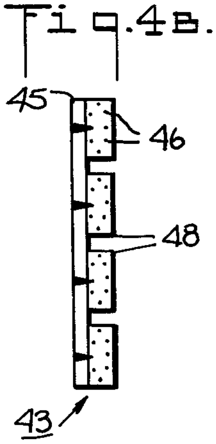
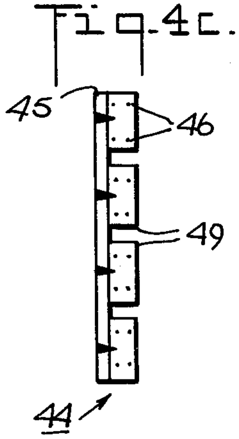
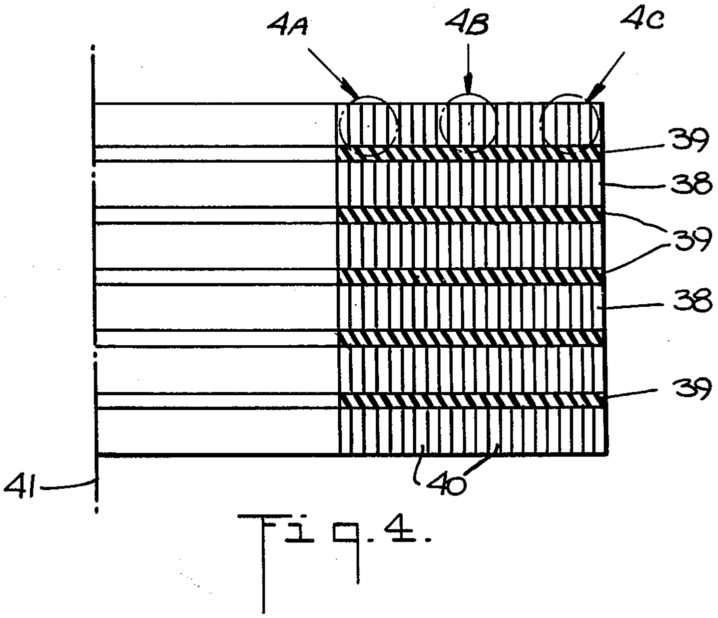
Fig. 4.

SUPERCONDUCTING MAGNET WITH RIBBON-SHAPED CONDUCTOR

BACKGROUND OF THE INVENTION

This invention relates to ribbon-shaped conductors of the type which are used in superconducting magnet coils in general and more particularly to an improved type of such conductor which has an increased transversal resistance to anvoid losses due to transversal currents.

When constructing superconducting magnets for high fields, the turns of the coils must be made of superconducting materials which can be stressed, for example, with current densities which often exceed $10^4$ A/cm$^2$. Typical materials which can be used for these purposes are niobium-zirconium and niobium-titanium alloys along with niobium-tin compounds. Conductors of these superconductive materials do, however, have high electrical resistances in the normal-conducting state. Thus, a magnet which is constructed using only pure, superconducting materials can be destroyed by the Joule heat produced if for some reason the superconducting material goes into normal conduction while in the excited state. The premature occurance of normal-conducting regions in large magnets causes what is called degradation, since long sections of superconductors can exhibit considerably lower critical current-carrying capacities than short sections of conductors of the same materials. One particular reason for this is the occurrence of macroscopic steps in the flux in individual sections. Such steps initially cause a small section of the conductor to become normally conducting. In turn, the Joule heat produced in this small section can cause large portions of the magnet coil to become normal conducting. Step jumps of this nature in the flux appear statistically and the probability of their occurrence is dependent on the length of the superconductor along with the current density in the conductor. Further, the frequency of such steps depends on the build-up rate of the excitation. Further causes for degradation in magnets result from the movement or even deformation of individual conductors in the turns of the magnet due to local mechanical stress differences. Because of all these various factors, degradation in large magnet coils can be particularly large.

Because of this, and in order to avoid destruction of the magnet coil, superconductors for use in high fields are stablized, for example, by copper or aluminum. In order to accomplish this, a plurality of thin superconducting wires are embedded in a copper or aluminum matrix. The cross section of the matrix must be made large enough so that it can carry the full current if normal conduction occurs. In addition, the Joule heat which will be generated under such circumstances, must be removed by a cooling medium, preferably liquid or supercritical helium in order to prevent larger portions of the coil from becoming normal conducting. Thus, the surfaces of the matrix are made, when what is termed full stabilization is desired, of such a size so that their thermal stress will remain low and will not exceed, for example, 0.4 watts per cm$^2$. In a stagnant coolant bath, such thermal stresses will result in a temperature rise of only a few tenths of a kelvin in the superconducting material, which temperature rise can be tolerated in these coils.

A type of ribbon-shape conductor of this nature has been disclosed in German Offenlegungschrift No. 1,765,917. As disclosed therein, these conductors may be used in magnet windings in which operating currents of several thousand amperes are present. The ribbon-shape conductors comprise a plurality of stabilized superconductor building blocks which are arranged directly adjacent to and connected with each other. A problem arises, however, in coils with windings made of these ribbon-shape conductors. Undesirable electric currents tend to flow transversally to the longitudinal direction of the conductor. These currents, referred to as transversal currents, are induced if the radial component of the magnetic flux changes with time. The result of such currents is losses in the conductor and a distortion of the field in the useful volume of the magnet, the local distribution and decay in time of which are difficult to predict, particularly if the windings are built up of fully stabilized superconductors.

Thus, it can be seen that there is a need for an improved type of ribbon-shape conductor which eliminates or reduces such transversal currents.

SUMMARY OF THE INVENTION

The present invention provides an arrangement which substantially reduces the transversal currents which frequently occur in the prior art devices of this nature. This is accomplished by arranging the individual conductors which make up the ribbon-shape conductor side-by-side on a planar reinforcing strip at predetermined equal spacings.

With such an arrangement, the excitation build-up losses due to transversal currents can be reduced substantially in magnet coils made up of the ribbon-shape conductors. The individual conductors or superconducting building blocks are made in that manner for reasons relating to manufacturing and in order to provide a basic building block which can be used in different systems. Thus, in a system requiring a plurality of these building blocks or individual conductors, the individual conductors, rather than being welded together as in the prior art, are according to the present invention welded to a steel reinforcing sheet at a predetermined equal spacing from one another. With this arrangement, the transversal resistance between the individual conductors is increased by a factor of more than $10^4$ as compared to the prior art arrangement wherein the individual conductors were welded together directly.

Various means of constructing the ribbon-shaped conductors of the present invention are disclosed. Preferably, in each case the individual conductors are electron beam welded to the reinforcing sheet. Typically, this weld will be in the center thereby halving the number of possible paths which transversal currents may take, i.e., the transversal resistance of the individual conductor itself is increased.

Also disclosed are different manners of carrying out this welding.

In addition, a manner of constructing the ribbon-shaped conductors such, that cooling may more easily be accomplished in which coolant may flow between the individual conductors is also shown. In addition, an embodiment in which cut-outs are made in the steel reinforcing sheets to aid in cooling is disclosed.

Since these conductors are particularly suitable for use in the windings of large superconductor magnets, it is possible to arrange a plurality of these ribbon-shaped conductors, for example, in this fashion about the axis of the magnet. That is, a line perpendicular to the flat sides of the ribbon-shaped conductors will also be perpendicular to the magnet axis. Since the field strength in the magnet decreases with distance from the magnet axis in the radial direction, the present invention also contemplates the use of individual conductors having different numbers of superconductors embedded therein, whereby the individual conductors can be selected, having only the required amount of superconducting material to conduct the required current in the field strength to which they will be subjected. Thus, the present invention takes advantage of the fact that the maximum current carrying capacity of superconductors depends to a large extent on the magnetic field acting upon them. However, for normal current carrying capacity such an effect is not present and thus, the individual conductors themselves as combined into the ribbon-shaped conductor will still have a constant cross-section with only the cross-section of the superconducting wires therein being changed. This arrangement provides for proper current carrying capacity under all conditions while at the same time minimizing the amount of expensive superconducting material required.

Since in some embodiments cooling through the channels between the individual conductors is not practical, a further embodiment is illustrated in which the individual conductors are more closely spaced and insulating material used to fill in the spaces between them therefore increasing the high transversal resistance of the overall ribbon-shaped conductor while still minimizing the overall width.

BRIEF DESCRIPTION OF THE DRAWINGS

FIG. 3 is a schematic perspective view of another embodiment of the invention in which the ribbon conductor is disposed in a superconducting magnet.

FIG. 4 is a partial, schematic, cross-sectional view of the magnet of FIG. 3 taken along section IV—IV, and FIGS. 4A, 4B and 4C are enlarged cross-sectional views of the individual ribbon conductors of the embodiments of FIGS. 3 and 4.

DETAILED DESCRIPTION OF THE PREFERRED EMBODIMENT

Figure 1:
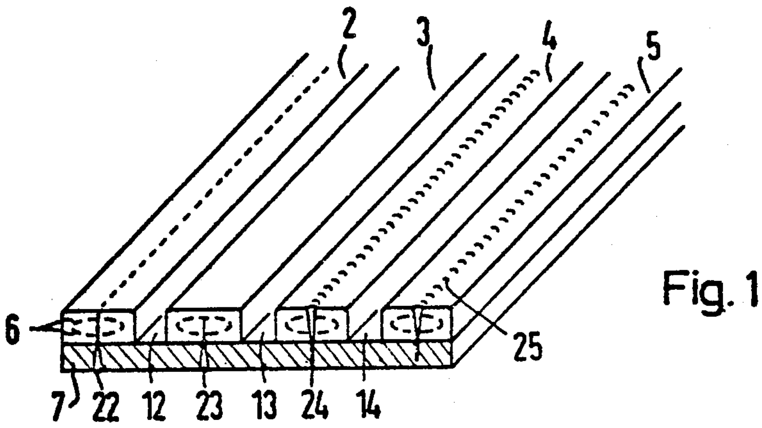
FIG. 1 is a perspective cross-sectional view of a embodiment of the present invention illustrating the individual conductors on a reinforcing strip and the various types of welds possible.

FIG. 1 illustrates the essential elements of the present invention. A plurality of individual conductors designated 2, 3, 4, and 5 and each containing embedded therein a plurality of superconducting wires designated by the numeral 6 are attached to a reinforcing strip 7, preferably by welding. As illustrated, the individual conductors 2, 3, 4, and 5 are arranged parallel to each other with spaces 12, 13 and 14 between the individual conductors. Various types of welded seams are also illustrated by FIG. 1. Welding will be done by a welding beam or the like preferably an electron beam. In each instance the weld runs lengthwise approximately through the center of each of the individual conductors. The weld seam 22 illustrates the type of weld which would be obtained by directing an electron beam against the bottom of the reinforcement strip 7. This weld extends completely through both the strip 7 and the individual conductor 2 as indicated by the dotted line on the top thereof. The weld 23 associated at the individual conductor 3 is similar except that it extends only partially into the individual conductor 3. Welds 24 and 25 are the result of directing an electron beam from the top longitudinally down the center of the respective individual conductor 4 and 5. As illustrated, the weld 24 extends all the way through both the individual conductor 4 and the strip 7 with the weld 25 extending all the way through the individual conductor 5 and only partially into the strip 7. As noted above, this not only separates the individual conductors reducing transversal currents therebetween, but also, because of the weld through the center, effectively reduces the transversal currents which can flow in an individual conductor by increasing its transversal resistance. Increases of a factor of more than $10^4$ as compared to individual conductors welded directly to each other have been experienced.

A typical conductor according to FIG. 1 may comprise, for example, seven individual conductors such as the conductor 3 illustrated on FIG. 1 each of rectangular cross section and made of oxygen-free copper in which is embedded 32 untwisted superconducting wires parallel to each other. Preferably such wires will be of a niobium-titanium alloy with 50 % by weight of titanium. These individual conductors with the superconductors therein will be formed by means of special cold forming and heat treatment operations well known in the art. Typically, each individual conductor will be 3 mm thick and 8.8 mm wide. The cross section ratio of copper to embedded superconductor wires is 20 : 1 for a conventional multicore building block. As will be pointed out below, this ratio may be varied based on the location of the ribbon-shaped conductor with respect to the magnet axis. Individual conductors are separated from each other by longitudinal grooves approximately 1 mm wide. They will be welded to the reinforcing strip 7 which can be 2 mm thick and made of stainless steel. Through the use of electron beam welding, an intimate bond between the copper of the individual conductors and the stainless steel of the reinforcing strip will result. Within the welded seam, partial mixing of the two materials occurs. Preferably, the welded beams will be produced from the exposed flat side of the reinforcing strip 7 and will penetrate only partially into the individual conductors such as the weld 23 shown on FIG. 1. With such a technique, only five or at most six of the superconducting wires embedded in the copper are destroyed or damaged. This corresponds to a loss of only about 20 % of the superconduction cross section.

As noted above, the ribbon-shaped conductors made in this manner are particularly well suited for windings in large superconducting magnets. Typically, the windings will be designed so that the ribbon-shaped conductors are arranged in disk fashion about the axis of the magnet. As is well known, the field strength in magnetics decreases with the distance from the magnet axis in the radial direction, i.e., a higher magnetic field strength is present at the inner regions of such a magnet than is present in its outer zones. It is also known that superconductors have a maximum current carrying capacity which depends strongly on the magnetic field acting upon them. They have relatively small maximum current carrying capacities in the interior of such a magnet where a high field is present and larger current carrying capacities at the outer zones where the magnetic field strength is less. Thus, rather than making each of the multicore building blocks or individual conductors the same as described above, the number of untwisted wires in each building block can be varied so that the cross section of the superconducting wires can be matched to the maximum current carrying capability when installed. An example of this embodiment of the invention is described later on herein with reference to FIGS. 3, 4 and 4A–4C. Rather than changing the number of wires, it is preferable to change the cross section of the superconducting wires while keeping the number of such wires the same. Thus, for ribbon-shaped conductors which are to be used in the inner portion of the magnet, individual conductors having superconducting wires of larger cross sectional areas will be used whereas in constructing the ribbon-shaped conductors for the outer regions of the magnets, individual conductors having superconducting wires of smaller cross section embedded therein may be used. The normal current carrying capacity of the copper remains the same so that for all operating conditions the arrangement is capable of carrying maximum current. This is done while at the same time obtaining a large reduction in the amount of superconducting wires required.

Figure 2:
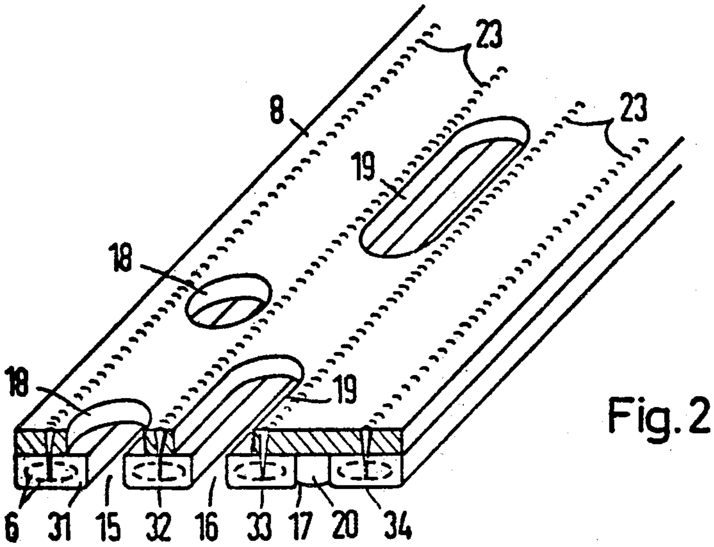
FIG. 2 is a similar view illustrating the preferred embodiment of the present invention in which cooling slots are cut in the reinforcing strip.

FIG. 2 illustrates a similar embodiment with a view of a reinforcing strip 8 from the bottom. Much in the manner described above, four individual conductors 31, 32, 33 and 34 are electron beam welded to the reinforcing strips 8. As shown, the welds are from the bottom of the reinforcing strip extending completely therethrough but only partially through the individual conductors 31 through 34. The individual conductors are separated by grooves designated 15, 16 and 17 as above. As noted, in a typical embodiment these grooves will be 1 mm wide. These in conjunction with cut-outs in the reinforcing strip 8 can aid in cooling of the conductor. Shown on the Fig. are circular cut-outs 18 and elongated cut-outs 19. These preferably, as shown, are located in the areas over the longitudinal grooves 15 to 17. The use of these cut-outs 18 and 19 permits a better coolant flow and thus, allows the overall conductor to become "more transparent" for coolant. This arrangement is particularly advantageous where the axis of the magnet in which the conductors are installed is horizontal. In that case, the grooves 15 to 17 act as cooling ducts and along with the cut-outs permit establishing a good flow of coolant. In such a case, the spacing may even be increased from the 1 mm described above to be several mm wide to thereby increase the amount of coolant which flows. In such an arrangement, the individual conductors are wetted by the coolant from three sides and therefore heat can be quickly removed therefrom.

If, however, the magnet axis is vertical, in which case effective cooling through the use of the grooves cannot be obtained, groove spacing can be decreased to 0.5 mm or less. In that case, the grooves are filled in with an insulating material 20 embedded between each two individual conductors. This tends to increase the transversal resistance of the overall conductor while at the same time reducing the overall size of the ribbon-shaped conductors so that the effective current density in the windings of the magnet is thereby effectively increased. In such a case heat is removed from the windings by cooling the narrow sides of the ribbon-shaped conductors or by a type of cooling known as duct cooling wherein the cooling flows through ducts which are provided between the layers of the windings made of the ribbon-shaped conductors. In each case the design and arrangement of the cooling ducts and cut-outs are chosen so that the coolant wets at least 30 % of the entire surface of the ribbon-shaped conductor directly. With such an arrangement, good cooling of the superconductor material is thereby assured.

FIGS. 3, 4 and 4A–4C schematically illustrate a hollow, cylindrical-shaped superconducting magnet 36 including a plurality of annular disc coils 38 which are approximately equal in size and are stacked in a plane disposed vertically, parallel to the axis of the magnet. A layer of insulating material 39 is disposed between coils 38, each of the latter of which comprise a plurality of windings of the ribbon conductors described above with reference to FIGS. 1 and 2. The flat side 40 of the ribbon conductors are disposed vertically, parallel to axis 41 of magnet 36.

As shown in FIGS. 4A–4C, the ribbon conductors are disposed at different radial distances from magnet axis 41. For example, conductor 42 is closer to the axis then conductor 43, and the latter conductor is closer than conductor 44. Each of conductors 42, 43 and 44 comprise four individual conductors, 47, 48 and 49, respectively, which are disposed in parallel relationship on reinforcing strip 45. A plurality of superconductive wires 46 are embedded in the individual conductors, with the number thereof in each conductor varying according to the radial distance of the latter from magnet axis 41. Thus, in the embodiment of the invention illustrated in FIGS. 4A–4C, the greatest number of superconductive wires 46 are disposed in conductors 47 and the least number of wires 46 are disposed in conductors 49. Conductors 48 each contain a number of superconductive wires which is intermediate between the numbers thereof disposed in conductors 47 and 49.

As described previously, the above arrangement permits the cross-section of superconductive material in the ribbon conductors to be adapted to the field intensity and current capacity conditions in a superconductive magnet by varying the number of superconductive wires in the individual conductors of the ribbon conductors. This is so, since in zones of low magnetic field intensity and thus greater current capacity, a smaller cross-section of superconductive material is required, i.e., the number of superconductive wires in the individual conductors can be less, than in zones of greater magnetic field intensity where larger cross-sections of superconductive material are required because of the lower current capacity.

A ribbon-shaped conductor of the type described above can be manufactured in simple fashion by bonding several individual conductors to the reinforcing strip in a common welding operation. In order to speed the manufacturing process, the welded seams of the individual conductors can be non-continuous i.e., alternate sections of the individual conductors can be welded and not welded to the reinforcing strip. Preferably, in such a case a weld on one individual conductor will be opposite an unwelded section of an adjacent individual conductor. In this way, the electron beam can be controlled to jump back and forth between two adjacent individual conductors alternately welding one or the other. In this manner, complete longitudinal welding along each of the individual conductors is not required and a substantial reduction in the time required for carrying out the welding process is accomplished. In carrying out the welding process, it is advantageous if the individual conductors along with their associated reinforcing strips are led through grooved rollers. With such an arrangement, equal spacing between adjacent individual conductors is maintained in a simple manner and the individual conductors then pressed solidly against the reinforcing strip during the welding.

Although specific types of conductors, i.e., copper for the individual conductors and niobium titanium for the superconducting wires, other materials may equally well be used. For example, the individual conductors may be made of other highly conductive metals such as aluminum. Similarly, the superconducting material may also be niobium-zirconium or niobium-titanium alloys as well as niobium-tin compounds.

Thus, an improved ribbon-shaped conductor for use in a superconducting magnet and a method of making such a conductor has been described. Although specific embodiments have been illustrated and described, it will be obvious to those skilled in the art that various modifications may be made without departing from the spirit of the invention which is intended to be limited solely by the appended claims.

What is claimed is:

1. A ribbon-shaped conductor having improved transversal resistance comprising:

a planar strip member; and a plurality of individual conductors, each having a plurality of superconductors embedded therein, welded to said strip member in parallel, spaced-apart relationship by a plurality of welds extending in the longitudinal direction of said individual conductors, with the welded seams thereof being disposed approximately perpendicular to said strip member and approximately at the center of the surfaces of said individual conductors contacting said strip member.

2. The conductor recited in claim 1, wherein said individual conductors comprise oxygen-free copper, and said superconductor wires are fabricated of a niobium-titanium alloy.

3. The conductor recited in claim 1, wherein said strip member is fabricated of stainless steel.

4. The conductor recited in claim 1, wherein said individual conductors have a rectangular cross-sectional shape and have one of their larger flat sides welded to said strip member.

5. The conductor recited in claim 1, wherein said ribbon-shaped conductors are disposed in a superconducting magnet, and wherein the cross-section of said superconductors embedded in said individual conductors is proportional to the distance of said conductors from the axis of said magnet, said cross-section decreasing as said distance from the axis of said magnet increases.

6. The conductor recited in claim 1, wherein said individual conductors have coolant flow spaces disposed therebetween in which a coolant may flow.

7. The conductor recited in claim 1, wherein the said individual conductors have spaces disposed therebetween which are filled with insulation material.

8. The conductor recited in claim 1, wherein said welds comprise electron beam welds.

9. The conductor recited in claim 1, wherein said welds include welded seams originating at one side of said strip member opposite said conductors and extending through said individual conductors, seams originating at said side of said strip member and extending partially through said individual conductors, seams originating at one surface of said individual conductors opposite that which is welded to said strip member and extending completely through said strip member, and seams originating at said surface of said individual conductors and extending partially through said strip member.

10. The conductor recited in claim 1, wherein said welds are not continuous in each of said individual conductors.

11. The conductor recited in claim 1, wherein said strip member includes cut outs disposed therethrough.

* * * * *